US005790754A

United States Patent [19]
Mozer et al.

[11] Patent Number: 5,790,754
[45] Date of Patent: Aug. 4, 1998

[54] SPEECH RECOGNITION APPARATUS FOR CONSUMER ELECTRONIC APPLICATIONS

[75] Inventors: Forrest S. Mozer, Berkeley, Calif.; Michael C. Mozer, Boulder, Colo.; Todd F. Mozer, Sunnyvale, Calif.

[73] Assignee: Sensory Circuits, Inc., Sunnyvale, Calif.

[21] Appl. No.: 327,455

[22] Filed: Oct. 21, 1994

[51] Int. Cl.[6] ............................................. G10L 7/04
[52] U.S. Cl. ...................... 395/2.41; 395/2.43; 395/2.09; 395/2.1; 395/2.57; 395/2.58
[58] Field of Search .................... 395/2.09, 2.1, 395/2.14, 2.15, 2.4, 2.41, 2.57, 2.58, 2.6, 2.62, 2.63, 21–24

[56] References Cited

U.S. PATENT DOCUMENTS

| | | | |
|---|---|---|---|
| 4,388,495 | 6/1983 | Hitchcock | 395/2.63 |
| 5,179,624 | 1/1993 | Amano et al. | 395/2.41 |
| 5,255,342 | 10/1993 | Nitta | 395/2.09 |
| 5,285,522 | 2/1994 | Mueller | 395/2.41 |
| 5,313,531 | 5/1994 | Jackson | 395/2.4 |
| 5,404,422 | 4/1995 | Sakamoto et al. | 395/2.41 |
| 5,461,697 | 10/1995 | Nishimura et al. | 395/2.41 |

OTHER PUBLICATIONS

"Digital Signal Processing in VLSI", Higgins, Analog Devices, pp. 36–43, 1990.

Benaim, M. "On Functional Approximation with Normalized Gaussian Units," *Neural Computation*, vol. 6, pp. 319–333, 1994.

Duda, R.O. and Hart, P.E., "Pattern Classification and Scene Analysis," Chapters 2 and 3, John Wiley & Sons, New York, 1973, pp. 10–84.

Moody, J. "Prediction Risk and Architecture Selection for Neural Networks," from *Statistics to Neural Networks: Theory and Pattern Recognition Applications*, Ed. by V. Cherkassky, J.E. Griedman, and H. Wechesler, *NATO ASI Series F*, Springer–Verlag, 1994, pp. 147–165.

Nowlan, S.J., "Max Likelihood Competition in RBF Networks," *Technical Report CRG–TR–90–2*, University of Toronto, Department of Computer Science, Connectionist Research Group, 1990.

Rumelhart, D.E., Hinton, G.E., and Williams, R.J., "Learning Internal Representations by Error Propagation," *Parallel Distributed Processing: Explorations in the Microstructure of Cognition*, vol. 1: Foundations, Ed. by D.E. Rumelhart, and J.L. McClellant, pp. 318–362, MIT Press/Bradford Books, Cambridge, MA, 1986.

Rumelhart, D.E., Durbin, R., Golden, R., and Chauvin, Y., "Backpropagation: The Basic Theory," *Back Propagation: Theory, Architectures, and Applications*, Ed. by Y. Chauvin and D.E. Rumelhart, Erlbaum Associates, Hillsdale, NJ, 1994, pp. 1–34.

(List continued on next page.)

*Primary Examiner*—Allen R. MacDonald
*Assistant Examiner*—Michael N. Opsasnick
*Attorney, Agent, or Firm*—Townsend and Townsend and Crew LLP

[57] ABSTRACT

A spoken word or phrase recognition device. The device does not require a digital signal processor, large RAM, or extensive analog circuitry. The input audio signal is digitized and passed recursively through a digital difference filter to produce a multiplicity of filtered output waveforms. These waveforms are processed in real time by a microprocessor to generate a pattern that is recognized by a neural network pattern classifier that operates in software in the microprocessor. By application of additional techniques, this device has been shown to recognize an unknown speaker saying a digit from zero through nine with an accuracy greater than 99%. Because of the recognition accuracy and cost-effective design, the device may be used in cost sensitive applications such as toys, electronic learning aids, and consumer electronic products.

21 Claims, 6 Drawing Sheets

OTHER PUBLICATIONS

Trevor Hastie et al., "Flexible Discriminant Analysis by Optimal Scoring," *Journal of the American Statistical Association*, Theory and Methods, Dec. 1994, vol. 89, No. 428, pp. 1255–1270.

Wolpert, D. (1992), "Stacked Generalization," *Neurald Networks*, 5, pp. 241–259.

L. Rabiner et al., "Fundamentals of Speech Recognition," 1993, pp. 69–73.

A.V. Oppenheim et al., "Digital Signal Processing," 1975, p. 198.

N. Morgan, "Talking Chips," 1984 pp. 39–41, 165–166.

5,790,754

SPEECH RECOGNITION APPARATUS FOR CONSUMER ELECTRONIC APPLICATIONS

BACKGROUND OF THE INVENTION

This invention relates to speech recognition and in particular to speech recognition in the context of low-cost applications.

Generally, a speech recognition device analyzes an unknown audio signal to generate a pattern that contains the acoustically significant information in the utterance. This information typically includes the audio signal power in several frequency bands and the important frequencies in the waveform, each as a function of time. The power may be obtained by use of bandpass filters or fast Fourier transforms (FFT). The frequency information may be obtained from the FFTs or by counting zero crossings in the filtered input waveform.

There are several dimensions along which speech recognition devices can be classified according to their mode of operation. One dimension divides recognizers into those that attempt to recognize unknown phonemes or words and those that attempt sentence recognition. To recognize sentences, a typical prior art technique first analyzes the patterns generated from the input speech waveform to produce a string of words or phonemes. This data is combined with linguistic information—contextual, lexical, syntactic, semantic, etc.— to generate the most likely sentence.

Another dimension distinguishes speech recognizers according to whether they are speaker dependent or speaker independent. In the former case, the recognizer is trained on the user's voice, while in the latter, this requirement is not made. Although speaker dependent recognition generally produces the better result, this improvement is paid for in the cost of the device and the complexity of its use. A major component of the increased cost of a speaker dependent recognition system is the random access memory required to store the user's training output.

Yet another dimension along which speech recognizers can be classified is the recognition algorithm. Typical known algorithms include a type of template matching that compares the unknown pattern with reference patterns, neural networks, and/or hidden Markov models.

None of the speech recognizers described above produce reliable, high accuracy recognition at a cost that is sufficiently low for their wide-spread incorporation in toys, educational learning aids, inexpensive consumer electronic products, etc. This is because these devices generally require a digital signal processor and/or large amounts of random access memory (RAM), the cost of either of which largely excludes the product from these markets.

An additional source of cost in the present day technology is that many speech recognition applications also require speech synthesis. In the prior art, separate electronics is provided to implement speech synthesis and recognition. Furthermore, in consumer devices particularly, all of the speech synthesis and recognition electronics are separate from the electronics used to control the remaining functions of the device.

What is needed is an inexpensive reliable speech recognition device suitable for consumer applications. The device should also incorporate speech synthesis capabilities and control of other functions without the addition of substantial extra hardware.

SUMMARY OF THE INVENTION

The invention provides an inexpensive spoken word or phrase recognizer with high recognition accuracy. The speech recognizer of the invention requires neither a digital signal processor, large amounts of random access memory to store data, nor large amounts of analog circuitry. Also, the hardware used to implement speech recognition may also synthesize speech and control other functions of an electronic apparatus in which the speech recognizer is embedded.

In accordance with a first aspect of the invention, the speech recognizer includes an analog-to-digital converter, a digital difference filter that produces band-pass-filtered representations of the input waveform in several frequency bands, and a microprocessor that estimates one or more acoustic parameters in each of several successive time windows. The microprocessor forms a matrix, whose rows are the obtained acoustic parameters of the several filter outputs and whose columns are the several time windows. Following completion of the utterance, the number of columns is normalized to a fixed size by averaging, interpolation, or extrapolation. The duration of the utterance is added to this data to produce the pattern that is presented to a classifier, also implemented by the microprocessor. The classifier recognizes the unknown pattern and assigns it to either a word class or a NOTA ("none of the above") class and determines the likelihood that the solution is correct.

All of the above electronics are incorporated in a single VLSI chip to minimize cost. The electronics is also available for synthesizing and for controlling other functions of the apparatus in which the recognizer is embedded.

In accordance with a second aspect of the invention, the microprocessor estimates power without performing multiplications and efficiently removes noise from the power estimate. This is done by evaluating the absolute values of samples of the filter outputs both during the spoken utterance and when only noise is present. The power is then estimated using weighted sums of logarithms.

In accordance with a third aspect of the invention, the classifier is a neural network that includes a representational transformer and a Bayes classifier. The representational transformer includes one or more hidden layers and transforms an input pattern to a special representational space. In accordance with the invention, classes have predetermined probability distributions in the representational space. The Bayes classifier accepts the transformed input pattern as an input and assigns a word class or the NOTA class by evaluating the posterior probability of each class and assigning the input to the class with the highest probability.

This neural network has been previously trained on a large number of speakers who have spoken the inventory of words that are in the recognition set. The result of this training is a table of weights that describe the strength of the connections between neurons in the neural net.

In accordance with a fourth aspect of the invention, multiple classifiers are used to improve recognition accuracy. A classification is assigned to the input pattern only if a predetermined number of classifiers agree.

The speech recognizer of the invention has been trained to recognize the digits from zero through nine. The recognition accuracy of this speaker-independent device is 94–97%, depending on the noise environment. When a further feature of the invention is included (which is to combine responses from two or more neural networks and to utilize the confidence of their several results in determining the answer), the recognition accuracy generally exceeds 99%, at the cost of asking the user to repeat the utterance a few percent of the time.

The invention will be better understood by reference to the following detailed description in connection with the accompanying drawings.

DESCRIPTION OF SPECIFIC EMBODIMENTS

Figure 1:
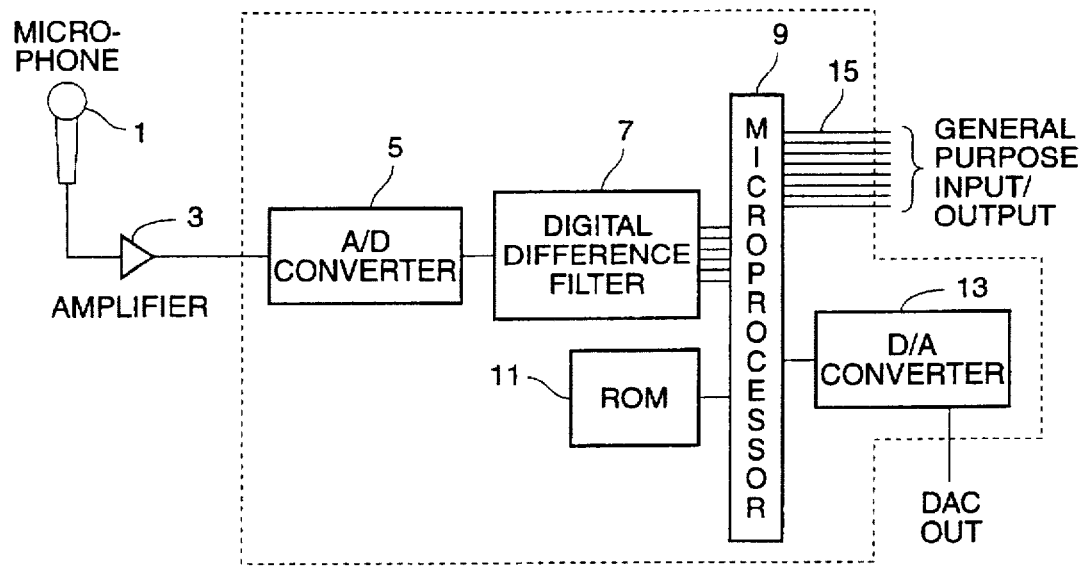
FIG. 1 is a block diagram of the speech recognition electronics in accordance with the invention.

FIG. 1 is a block diagram of the speech recognition electronics according to the invention. The speech recognition electronics include a microphone 1, an amplifier 3 an A/D converter 5, a digital difference filter 7, a microprocessor 9, a ROM 11, a D/A converter 13, and a general purpose input/output port 15. The microphone 1 of this figure can be an inexpensive electret microphone whose output audio amplitude is typically 10–100 millivolts. The microphone 1 is followed by the amplifier 3, which is of a type that is well-known in the art and whose purposes are to increase the audio amplitude by a factor of 10–100, to filter from the analog audio signal the power above the Nyquist frequency of the analog-to-digital converter 5, and to pre-emphasize the input frequency spectrum to optimize the waveform for the recognition process.

The analog-to-digital converter 5, the digital difference filter 7, and the microprocessor 9 comprise the major elements incorporated into the VLSI chip that performs the functions of the preferred embodiment of the present invention. The analog-to-digital converter 5 converts the incoming analog audio waveform into 12 bit digital representations at 20,000 samples/second. It is an R-2R ladder converter of a type that is well-known in the art. The output of the analog-to-digital converter 5 is fed to the digital difference filter 7 whose operation is described below.

The Digital Difference Filter

The digital difference filter 7 repetitively performs the following calculation on input data X(n) at time step n to produce the output data point Y(n), $$Y(n)=AY(n-1)+BX(n)+CX(n-1) \quad (1)$$

Figure 2:
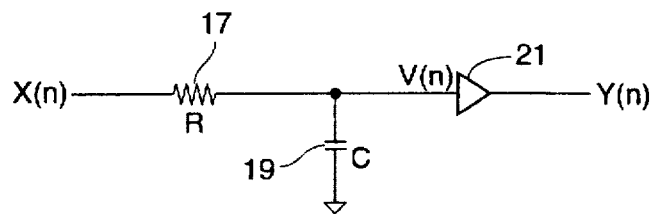
FIG. 2 is a circuit diagram of a single pole low pass filter and amplifier, whose difference equation is utilized to digitally filter the audio waveform.

Equation (1) is the difference equation for a single pole RC filter, which is a high pass filter if B=−C and a low pass filter if B=C. The following derivation proves this statement for the case of a low pass filter. Consider the circuit of FIG. 2 which is a low pass filter comprised of a resistor 17 and a capacitor 19, followed by an amplifier 21 whose gain is G. X(n) is the input signal to this filter, V(n) is the voltage at the input to the amplifier, and Y(n) is the output voltage from the amplifier. Between time steps (n−1) and n, the average current through the resistor 17 is about equal to the average of the currents through the resistor 17 at the beginning and at the end of the time step. Thus, $$<I> = \frac{[X(n)-V(n)]}{2R} + \frac{[X(n-1)-V(n-1)]}{2R} \quad (2)$$

The change of voltage across the capacitor 19 during the time Δt between steps (n−1) and n is the charge delivered by the current <I> divided by the capacitance of the capacitor 19. Thus, $$V(n)-V(n-1)=<I>\Delta t/C \quad (3)$$

Because the amplifier has gain G, the relation between its input and output is $$Y(n)=GV(n) \quad (4)$$

Solving equations (2), (3), and (4) gives equation (1) with $$A = \frac{(1-\Delta t/2RC)}{(1+\Delta t/2RC)} \quad (5)$$

$$B = C = \frac{G\Delta t/2RC}{(1+\Delta t/2RC)} \quad (6)$$

From these equations, the cutoff frequency of this filter (given by 2×π×v×RC=1) is:

$$v = \frac{D/A \; rate}{\pi} \times \frac{(1-A)}{(1+A)} \quad (7)$$

The gain of the circuit is:

$$G = \frac{2B}{1-A} \quad \text{if } C = B \quad (8)$$

or $$G = \frac{2B}{1+A} \quad \text{if } C = -B \quad (9)$$

Figure 3:
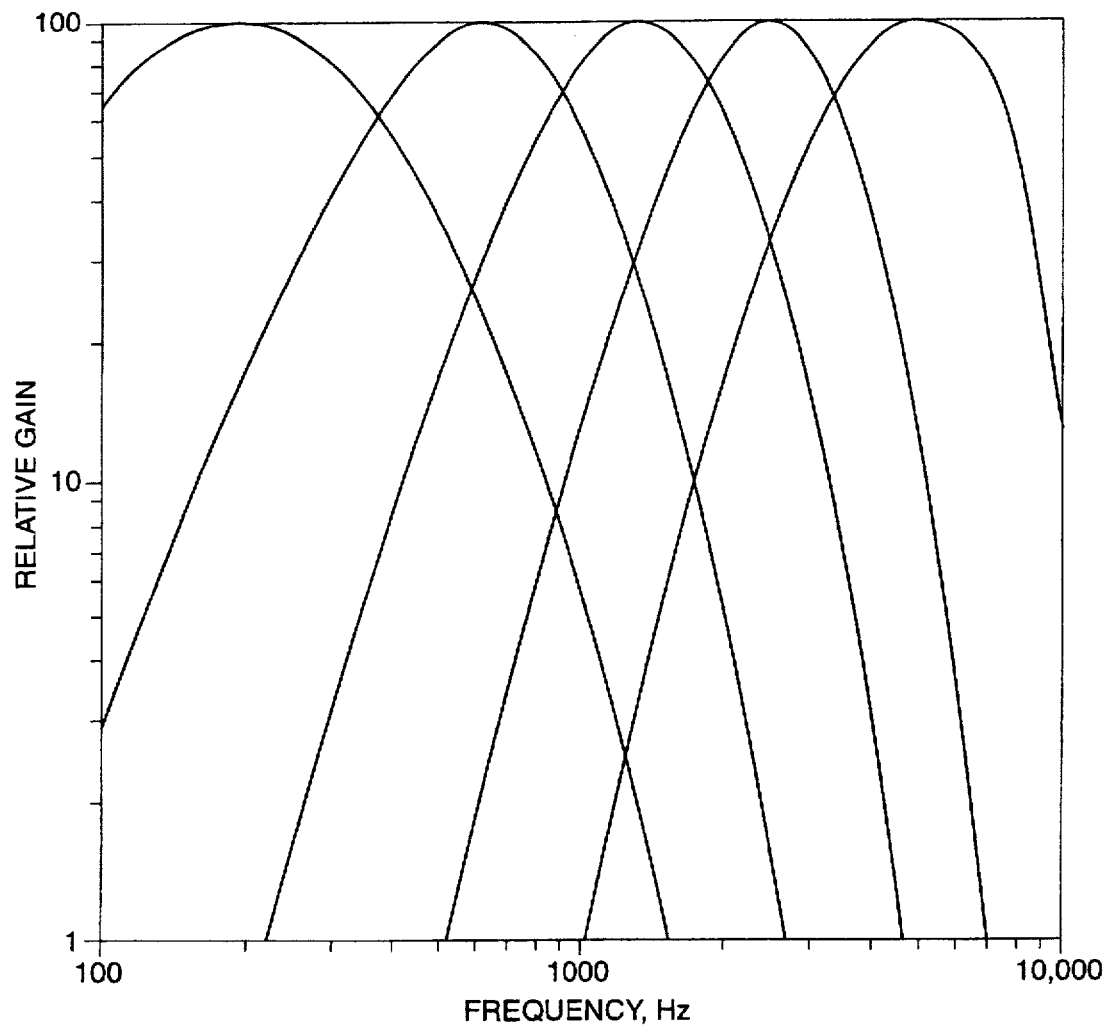
FIG. 3 is a graph of the frequency responses of the bandpass filters produced by a digital difference filter in accordance with the invention.

The single pole filter of equation (1) is cascaded as many as 50 times in the preferred embodiment of digital difference filter 7. Some elements of the cascade are high pass filters and others are low pass filters. In the preferred embodiment, they combine to produce as many as 6 filtered output waveforms. An example of the frequency response curves of 5 such filters produced by the cascade of the preferred embodiment is given in FIG. 3. For each of the five filters of FIG. 3, equation (1) is applied successively 7, 9, 11, 13, and 8 times respectively to the input waveform to produce the five filtered output waveforms that are made by digital difference filter 7.

It is noted that equation (1) contains the leading terms of an infinite impulse response filter, which is well-known in the digital signal processing art. The form of equation (1) was selected for the preferred embodiment because of the simplicity of its hardware implementation. Nevertheless, other forms having similar functions could be implemented within the scope of the present invention.

In the preferred embodiment of the invention, the values A, B, and C for each of the filter calculations are provided to digital difference filter 7 by microprocessor 9. Values of A, B, and C are selected such that no multiplication in equation (1) requires more than two shifts and adds. Furthermore, B is constrained to be either 2, 1, 0.5, or 0.25, and (1−A), which is stored in place of A, can be any fraction less than one whose denominator is 32 and whose numerator is such that the multiplication of (1−A) and Y(n−1) can be performed in no more than two shifts and adds. These limitations simplify the circuitry and permit digital difference filter 7 to execute equation (1) as many as 50 times in the 50 microsecond time interval between incoming digital data points.

Figure 4:
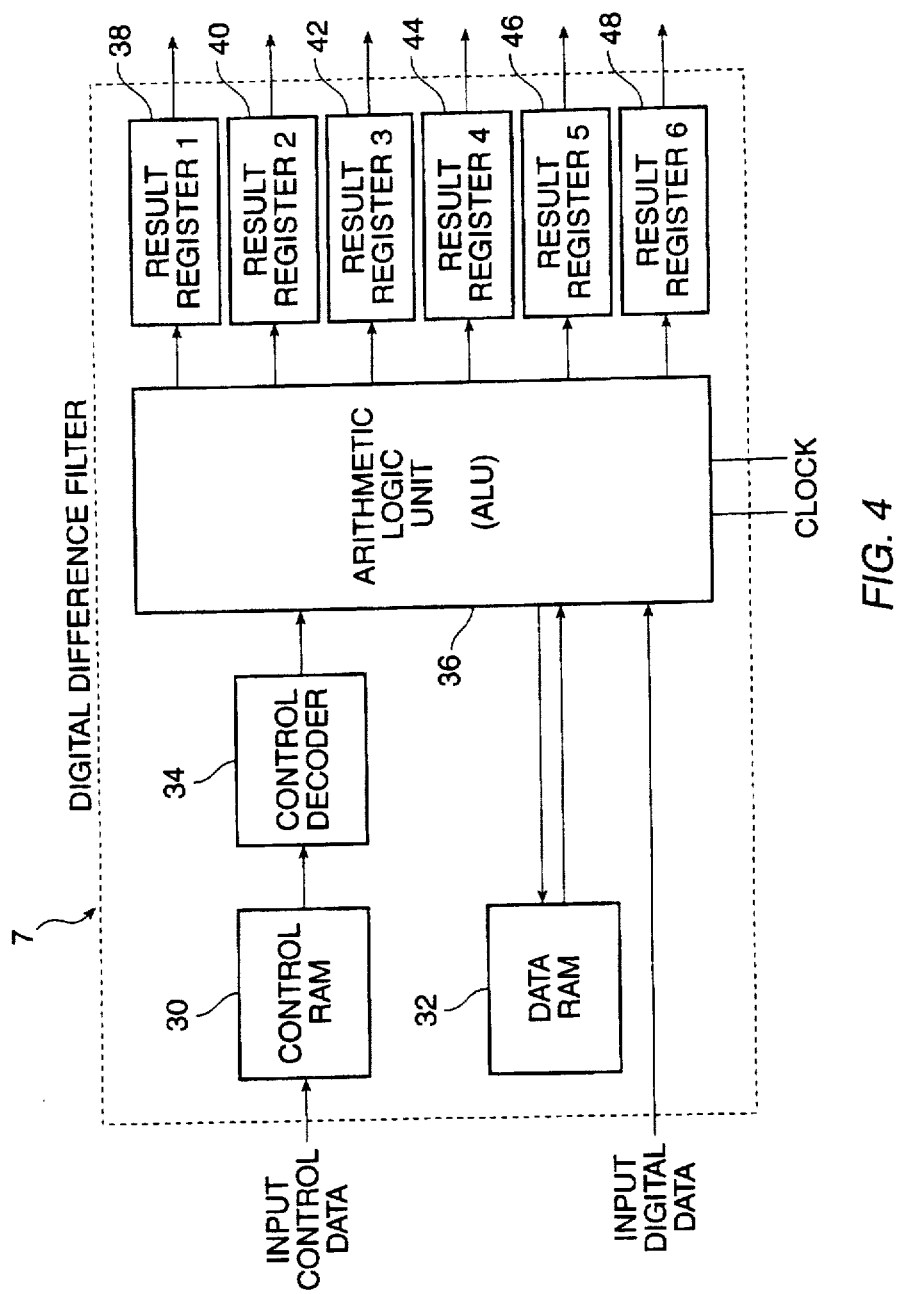
FIG. 4 is a block diagram of a digital difference filter in accordance with the invention.

FIG. 4 depicts digital difference filter 7 in accordance with the invention. In the preferred embodiment, digital difference filter 7 includes a control RAM 30, a data RAM 32, a control decoder 34, an arithmetic logic unit 36, and result registers 38, 40, 42, 44, 46, and 48.

The control RAM 30 is a 64×8 static random access memory (SRAM) that holds control information which represents the sequence of filter coefficients A, B, and C. The control information is loaded by the microprocessor 9 in load mode. Thereafter, the digital difference filter 7 acts like a sequencer since the SRAM locations are accessed sequentially and the control bytes are read and interpreted until an End Marker command is found. The data RAM 32 is a 64×16 SRAM that is a temporary storage of the outputs of equation (1) that are used as inputs for the next stage of filtering.

The control byte decoder 34 interprets the filter coefficients received from control RAM 30. The ALU 36 receives decoded instructions for executing equation (1) from control decoder 34 and then executes equation (1) on the input digital data. The six result registers 38, 40, 42, 44, 46, and 48 receive and hold the outputs of the 6 filter stages.

The filter input clock runs at 4.77 MHz. Inside filter 7, this clock is divided by four to produce a single filter cycle. In the read phase, the input digital data is acquired from the A/D converter 5. In the calculate phase, the control byte is decoded by decoder 34 and ALU 36 performs the appropriate single pole filter computation of equation (1). In the write phase, the result is written back to data RAM 36, and, optionally, to one of 6 result registers 38–48. In the address increment phase, the address counter in ALU 36 is incremented or reset to 0 in the case of an End Marker command. The End Marker command causes all 6 result registers 38–48 to be read to a set of 6 latches that can be interrogated by the processor. Each result register may be read as an absolute value or unmodified.

A set of filter coefficients A, B, and C are stored in a single byte of data, which has the following format:

D7 D6 D5 D4 D3 D2 D1 D0

A4 A3 A2 A1 A0 C0 B1 B0

The value A4 A3 A2 A1 A0 gives the value of coefficient A, C0 gives the sign of coefficient C, and B1 and B0 give the value of B, as in Table 1 below. This format allows the filter coefficients to be stored with minimal storage.

TABLE 1

| A4 | A3 | A2 | A1 | A0 | Value of A | B1 | B0 | Value of B |
|---|---|---|---|---|---|---|---|---|
| 0 | 1 | 1 | 1 | 1 | 0/32 | 0 | 0 | 1/4 |
| 0 | 1 | 1 | 0 | 0 | 1/32 | 0 | 1 | 1/2 |
| 0 | 1 | 1 | 0 | 1 | 2/32 | 1 | 0 | 1 |
| 0 | 1 | 1 | 1 | 0 | 4/32 | 1 | 1 | 2 |
| 1 | 1 | 0 | 1 | 1 | 8/32 | 1 | 1 | 0 |
| 1 | 0 | | | | 12/32 | x | x | x |
| 1 | 1 | 0 | 0 | 1 | 14/32 | | C0 | Value of C |
| 1 | 1 | 0 | 0 | 0 | 15/32 | | 0 | −B |
| 0 | 1 | 0 | 1 | 1 | 16/32 | | 1 | +B |
| 0 | 1 | 0 | 0 | 0 | 17/32 | | 1 | 0 (if A = GAIN) |
| 0 | 1 | 0 | 0 | 1 | 18/32 | | | |
| 1 | 0 | 1 | 1 | 0 | 20/32 | | | |
| 1 | 0 | 1 | 0 | 1 | 22/32 | | | |
| 1 | 0 | 1 | 0 | 0 | 23/32 | | | |
| 0 | 0 | 1 | 1 | 1 | 24/32 | | | |

TABLE 1-continued

| A4 | A3 | A2 | A1 | A0 | Value of A | B1 | B0 | Value of B |
|---|---|---|---|---|---|---|---|---|
| 0 | 0 | 1 | 0 | 0 | 25/32 | | | |
| 1 | 0 | 0 | 0 | 1 | 26/32 | | | |
| 1 | 0 | 0 | 0 | 0 | 27/32 | | | |
| 0 | 0 | 0 | 1 | 1 | 28/32 | | | |
| 0 | 0 | 0 | 0 | 0 | 29/32 | | | |
| 1 | 0 | 0 | 1 | 1 | 30/32 | | | |
| 1 | 0 | 0 | 1 | 0 | 31/32 | | | |
| 1 | 0 | 1 | 1 | 1 | 0/32 | | | GAIN Stage, C = 0 |

The Acoustic Pattern

Microprocessor 9, which receives the filtered waveforms from the digital difference filter 7 has a conventional architecture. Utilizing code stored in ROM 11, this microprocessor performs four major functions analyzing the filtered input waveforms to produce a pattern in real time that contains the significant acoustic information in the input signal.

executing neural network software to determine which utterance in the recognition set was spoken, and to estimate the likelihood that this answer is correct.

synthesizing messages spoken by the electronics.

executing the control code that determines the operation of the product in which the electronics resides.

One of the filtered input waveforms to microprocessor 9 is used for dynamic thresholding that determines the temporal boundaries of the audio signal. The remaining inputs are analyzed in terms of zero crossing rates and wave power in time blocks of 25 milliseconds. The zero crossing rate is a well-known measure of the dominant frequency in the filtered waveform. Quantities proportional to the logarithm of the zero crossing rates are included in the pattern generated by microprocessor 9.

In the final pattern of data representing the acoustic information in the input signal, the desired power measure is an eight-bit number that represents the logarithm of the power in the signal, after removal of the noise. This power measure has a dynamic range such that a factor of two change in signal amplitude produces a 20 unit change in the power measure. In the prior art, such a power measure was obtained by taking fast Fourier transforms or by computing the sum of the squares of the amplitudes of the successive data points.

The inventors have discovered a technique for obtaining a power estimate that does not require multiplications in the microprocessor and that efficiently removes noise from the power estimate. The algorithm consists of computing the sum of the absolute values of the amplitudes of the data points in each filtered waveform over the 25 millisecond window of each calculation. The appropriately normalized logarithm of this quantity is compared to the logarithm of the true power, determined as the sum of the squares of the amplitudes, for the case of a large signal to noise ratio, in Table 2. In this table, the results of a computer simulation are presented in which signal points were randomly obtained from white noise or sinusoidal distributions.

TABLE 2

| Input Signal Amplitude | Log Of The True Signal Power | Log Of The Absolute Amplitude Values |
|---|---|---|
| 160 | 242 | 244 |
| 80 | 223 | 225 |

TABLE 2-continued

| Input Signal Amplitude | Log Of The True Signal Power | Log Of The Absolute Amplitude Values |
|---|---|---|
| 40 | 202 | 204 |
| 20 | 182 | 184 |
| 10 | 162 | 164 |
| 5 | 142 | 144 |

Since $\log(A^2)=2 \log |A|$, the agreement in Table 2 may seem obvious until one realizes that what is actually compared in Table 2 is $\log (A_{12}+A_2+A_{32}+ \ldots )$ with $\log (|A_1|+|A_2|+|A_3|+ \ldots )$. The agreement of these two quantities is not obvious and must be proven by computer simulations of waveforms having amplitude distributions like those in speech.

In the presence of noise, the estimate of signal power includes a growing error as the signal-to-noise ratio approaches one. In accordance with the invention, the noise errors are removed by a technique that involves absolute values of the (signal+noise) points, $(S+N)_i$, measured during the signal and the noise points, $N_i$, measured before the signal, in the following way.

Log Of The Absolute Amplitudes = (10)

$0.75 \times \log [|(S + N)_1| + |(S + N)_2| + \ldots ] +$ $0.25 \times \log [|(S + n)_1| - |N_1| + |(S + N)_2| - |N_2| + \ldots ]$ In Table 3 the results of the technique of the invention is compared to a prior art technique where the true signal power is estimated as the sum of the squares of the (signal+noise) points minus the sum of the squares of the noise points.

TABLE 3

| Input Signal Amplitude | Input Noise Amplitude | Log Of The True Signal Power | Log Of The Absolute Amplitudes |
|---|---|---|---|
| 160 | 20 | 243 | 244 |
| 80 | 20 | 223 | 223 |
| 40 | 20 | 202 | 201 |
| 20 | 20 | 182 | 179 |
| 10 | 20 | 163 | 166 |
| 5 | 20 | 140 | 153 |

In the limit of low noise, equation (10) becomes equal to that which produced the third column of Table 2. It is seen from Table 3 that this technique accurately reproduces the true estimate of the power in the signal after noise subtraction for signal-to-noise ratios greater than ¼.

Thus, in accordance with the invention, the power measure is estimated rapidly without the use of extensive multiplications required in the prior art. Circuitry of the simplicity and low cost employed in the preferred embodiment could not calculate the square of even one number, let alone all the calculations required for the full power measurement, in the time taken the technique of the invention. Furthermore, it would be too expensive in ROM usage to do multiplies by table look-up. This technique is crucial to achieving a reliable speech recognizer that does not require a digital signal processor.

Following completion of the utterance, the 25 millisecond data blocks are averaged and interpolated or extrapolated as necessary to produce a fixed, predetermined, number of time intervals in the pattern (10 in the preferred embodiment). Then the power measurements are normalized to remove information from the pattern on how loud the speaker spoke, since such information is not part of the acoustical data required to know what word was spoken. To this pattern of zero crossings and signal power is added a number proportional to the logarithm of the duration of the utterance, and the resultant, an example of which is given in Table 4, is fed to the neural network software operating in the microprocessor 9.

TABLE 4

| Time slot | 1 | 2 | 3 | 4 | 5 | 6 | 7 | 8 | 9 | 10 |
|---|---|---|---|---|---|---|---|---|---|---|
| Power in filt | 1 | 0 | 3 | 54 | 104 | 121 | 63 | 21 | 8 | 0 |
| Power in filt | 2 | 0 | 4 | 55 | 119 | 134 | 68 | 9 | 12 | 0 |
| 0 xngs in filt 2 | 124 | 125 | 118 | 119 | 119 | 119 | 122 | 121 | 125 | 123 |
| Power in filt 3 | 1 | 13 | 53 | 105 | 126 | 56 | 11 | 30 | 5 | 0 |
| 0 xngs in filt 3 | 175 | 185 | 169 | 142 | 133 | 156 | 156 | 166 | 174 | 167 |
| Power in filt 4 | 35 | 61 | 68 | 92 | 110 | 39 | 0 | 38 | 41 | 18 |
| 0 xngs in filt 4 | 206 | 206 | 198 | 189 | 186 | 181 | 189 | 201 | 206 | 206 |
| Power in filt 5 | 72 | 106 | 87 | 85 | 106 | 33 | 4 | 75 | 79 | 52 |
| 0 xngs in filt 5 | 215 | 217 | 211 | 199 | 197 | 211 | 223 | 217 | 217 | 214 |
| Duration | 38 | | | | | | | | | |

Table 4 gives the pattern produced by speaking the word "six." The data in the pattern clearly indicate that "six" is the word spoken because the powers are all low near time slot 7, which corresponds to the silence before the final plosive in the spoken word; the high frequency power (filters 4 and 5) is large compared to the low frequency power near the beginning and end of the utterance, which suggests that fricatives are present at the two ends of the utterance; and the zero crossing rates at these times are relatively large, which suggests that the fricatives are both "s." This type of information causes the neural network to identify this pattern as the word "six."

Figure 5:
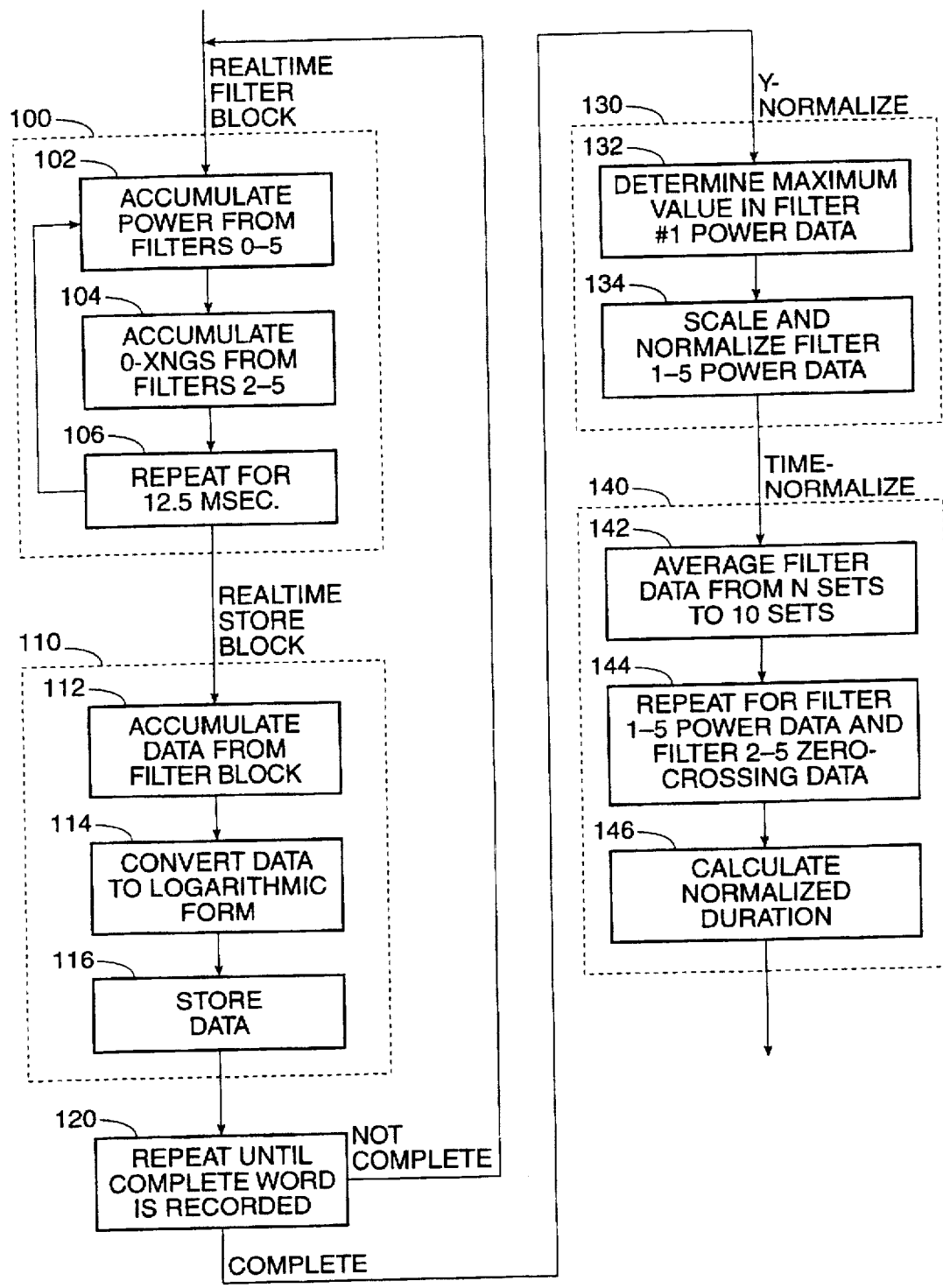
FIG. 5 is a flowchart describing the steps of deriving acoustic information in accordance with the invention.

FIG. 5 is a flowchart describing the steps of deriving acoustic information as in Table 4 in accordance with the invention. The pattern of acoustic information generated from the input waveform is of small size and is produced in real time, i.e., concurrently with capture of the audio information by microphone 1, in order to avoid the requirement of a large RAM. The real time filter-block routine 100 accumulates data from digital difference filter 7, including power data and zero crossing data in 12.5 millisecond blocks. First, the absolute value of the amplitude is summed for each filter (0 through 5) at step 102. This is done by adding the absolute value of the signal provided by the filter in the current time slice to the sum calculated in the previous time slice. Next, at step 104, zero crossings are accumulated by comparing the sign of the filter signal in the current time slice to the sign of the signal in the previous time slice, and incrementing the zero crossing measurement if they are different. Zero crossings are accumulated for filters 2 through 5. Step 106 indicates the repetition of steps 102 and 104 every 12.5 milliseconds.

The real time store-block routine 110 collects and averages 25 milliseconds of data for each of nine values produced by filter-block routine 100 at step 112 (filter 0 power is used to determine the beginning and ending of the utterance, but is not included in the pattern that is passed to the neural network software). These nine values are then converted into logarithmic form at step 114, and a previously calculated noise estimate is subtracted. The resulting set of nine values is stored in memory for later use at step 116. The filter-block routine 100 and store-block routine 110 are repeated at step 120 until a complete word has been recorded.

When the utterance is complete, y-normalize routine 130 normalizes the power measurements to remove information from the pattern on how loud the speaker spoke. At step 132, the maximum value in the filter 1 power data is determined and scaled for use as a reference value. At step 134, the data in each row of filter power, for filters 1 through 5, is scaled and normalized by predetermined coefficients, and the reference value is subtracted.

Finally, time-normalize routine 140 is called. At step 142, the data is normalized over a fixed number of time intervals (10 in the preferred embodiment). If fewer than the predetermined number of data sets were stored by store-block routine 110, the data are extrapolated to produce the desired number of sets. If more than the predetermined number of sets was stored, the data are interpolated to produce the predetermined number of sets. At step 144, this process is repeated for each of the nine rows of filter data (filter 1 through 5 power, and filter 2 through 5 zero crossings). Then at step 146, the routine calculates a number proportional to the logarithm of the duration of the utterance and appends it to the pattern. The result is a pattern like that in Table 4, where each row from left to right represents a particular filter measurement of power or zero crossings, and each column represents an equal fraction of the duration of the utterance.

The Neural Network

Following acquisition of an acoustic pattern such as that in Table 4, the pattern is passed to software running in microprocessor 9 that performs a neural network analysis of the pattern. Neural networks are computing devices that are loosely based on the operation of the brain. A neural network consists of a large number of simple processing units (or neurons), massively interconnected and operating in parallel. The benefit of using a neural network for pattern recognition is that it can learn to perform the pattern recognition task by studying sample patterns corresponding to the inventory of words in the recognition set. That is, rather than programming a computer to perform the recognition, the neural network programs itself by studying many examples. In the preferred embodiment, the neural network has been trained on approximately 300 recordings of speakers saying the numbers from "zero" through "nine" and the words "yes" and "no."

The task of the neural network is to classify a static representation of a speech signal, denoted by the vector x with $n_x$ elements, as being one of $n_x$ alternatives. These alternatives consist of the words in the vocabulary as well as a "none of the above" (NOTA) class. The input to the neural network is the pattern produced by the filtering and normalization processes described earlier (see Table 4). The output of the network is a probability, for each class k, that the input was a member of class k. This probability is denoted $z_k$. The input is then assigned to the class with the highest probability. The neural network does not incorporate the linguistic information required to recognize continuously spoken sentences because of the computational burden of using such information.

The qualitative operation of the neural network is first described using standard neural network terminology. A formal mathematical description of the computations performed by the neural network is then presented.

Figure 6A:
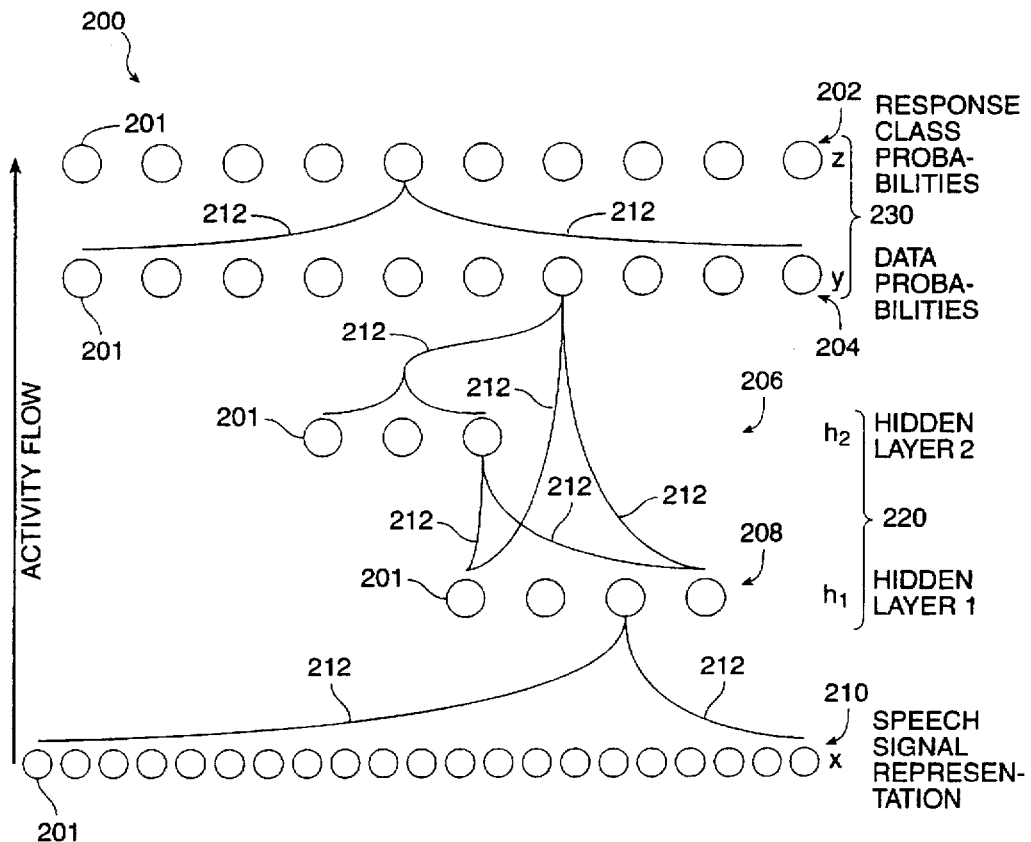
FIG. 6a is a schematic depiction of a neural network classifier in accordance with the invention.

FIG. 6 is a schematic depiction of a neural network classifier 200 in accordance with the invention. Each circle represents a processing unit 201 in the neural network classifier 200. The units are arranged in five layers 202, 204, 206, 208, and 210-the horizontal rows of circles. Each unit 201 has an activity level, a scalar value. The input units in layer 210 are shown at the bottom of the figure; the pattern of activity over these units corresponds to the speech signal representation, x. The output units in layer 202 are shown at the top of the figure; the pattern of activity over these units corresponds to the response class probabilities, z.

Activity in one unit can influence the activity in other units to which it is connected. Activity in the network 200 flows upward, from the input to the output. Rather than showing individual connections between the units 201, the curved lines 212 are used to depict the set of units feeding activity into a particular unit. For simplicity, connectivity is shown for just one unit in each layer; all other units in the layer have the same connectivity. The input layer 210 produces activity in hidden layer 1 208. The hidden layer 1 208 then activates hidden layer 2 206, and then the penultimate layer-called the data probability layer 204 for reasons to be explained below—is activated by both hidden layers 1 and 2 206 and 208. Finally, the output layer 202 receives activation from the penultimate layer. The specific activation dynamics are given below, after first presenting a mathematical characterization of the network's computations.

The invention can be better understood by comparison to a traditional Bayes classifier. A traditional Bayes classifier calculates the posterior probability of each class k.

$$z_k = p(\text{class } k|x) \tag{11}$$

and assigns the input to the class c with the highest probability:

$$c = \underset{k}{\text{argmax}} z_k. \tag{12}$$

[Duda73]. The posterior probabilities are computed using Bayes' rule:

$$z_k = \frac{Y_k P(\text{class } k)}{\Sigma_l Y_l P(\text{class } l)} \tag{13}$$

where $$y_l = p(x|\text{class } l) \tag{14}$$

denotes the data likelihood for class l and p(class l) is the prior probability of the class (known as the class prior).

In accordance with the invention, the traditional Bayes classifier is altered in the following way. Rather than operating on the input pattern directly, the neural network first transforms x into a new representation, h, and calculates data likelihoods based on the transformed representation:

$$y_k = p(h|\text{class } k). \tag{15}$$

The mapping from x to h is computed as follows:

$$h_1 = f_1(W_1 x + b_1) \tag{16}$$

$$h_2 = f_2(W_2 h_1 + b_2) \tag{17}$$

where $h_1$ has dimension $n_{h_1}$, and $h_2$ has dimension $n_{h_2}$, h is the concatenation of $h_1$ and $h_2$ and has dimension $n_h = n_{h_1} +$ $n_{h_2}$, $W_1$, $W_2$, $b_1$, and $b_2$ are the weight parameters of the neural network and are set by the neural network training procedure, described below. The functions $f_1$ and $f_2$ map n-dimensional vectors to n-dimensional vectors on a unit-by-unit basis, the mapping for each element being either the hyperbolic tangent, tanh, or the identity map, as selected for a particular application (see selection procedure below).

Each word class is modeled by a multivariate Gaussian distribution with covariance matrix $vI$ over the $n_h$ dimensional space of h:

$$p(h|\text{class } k) = (2\pi v_k)^{-n_h/2} \exp\left(-\frac{|h - m_k|^2}{2v_k}\right) \quad (18)$$

where $m_k$ is the center of the Gaussian and $v_k$ is the uniform variance. The parameters of the Gaussian are set during training of the neural network.

It is the task of the neural network to transform the inputs x so that they have a Gaussian distribution in the h space. A Gaussian turns out to be a particularly convenient distribution computationally, and one that has relatively few free parameters. In an alternative embodiment, a multivariate beta distribution is used instead. The multivariate beta distribution is advantageous in that the domain of this distribution is restricted to a fixed interval, as are the points in the h space when the tanh nonlinearity is applied. For either distribution, because the covariance matrix is an identity matrix, computation is greatly simplified.

While instances of each word class are assumed to be densely clustered in a region, the NOTA class is assumed to be spread broadly throughout the space, i.e., it can be represented by a uniform distribution in h. If the distribution covers the space, then the appropriate density function is $$p(h|\text{NOTA class}) = 2^{-n_h} \quad (19)$$

because $h \in [-1,1]^{n_h}$ if $f_1 = f_2 = \tanh$. Alternatively, the spread of this distribution may be left as a free parameter, constrained to be positive, $$p(h|\text{NOTA class}) = \mu_{NOTA}. \quad (20)$$

The neural network classifier 200 of the invention can thus be understood as a combination of a representation transformer 220 and a Bayes classifier 230 with Gaussian class conditional densities. The representation transformer includes the hidden layers 206 and 208. The Bayes classifier includes the penultimate and ultimate layers 204 and 202.

The combination of these two elements provides significant advantages. Gaussian classifiers alone require extensive computational resources to implement because the covariance matrix for the untransformed input distribution is fully populated. This is known in the art as the problem of dimensionality. On the other hand, standard feedforward neural networks are relatively inefficient because they do not take advantage of any knowledge of the statistical structure of the network input. One of the primary benefits of this combination is that its parameters can be set using neural network training techniques.

It is known in the prior art to interpret neural network operation within a probabilistic framework, [Rumelhart94], and that neural network architectures can include a layer of normalized Gaussian units. [Benaim94];[Nowlan90]. The neural network of the invention differs, in among other respects that units explicitly represent probability densities over transformed input representations, priors over alternative responses are considered, and a Bayesian decision rule is applied.

Training the Neural Network

The goal of training the neural network is to obtain a set of parameters, $P = \{W_1, W_2, b_1, b_2, M, v, \mu_{NOTA}\}$, (the matrix M denotes the set of Gaussian means, $\{m_k\}$, and the vector v denotes the Gaussian variances, $\{v_k\}$) which are then incorporated into ROM 11. The training procedure itself is performed off-line on a digital computer.

The training data for the neural network is a corpus of pairs $$\{(x^{(1)}, t^{(1)}), (x^{(2)}, t^{(2)}), \ldots, (x^{(E)}, t^{(E)})\} \quad (21)$$

where each pair consists of an input x and a target class t. The purpose of teaming is to adjust the free parameters of the neural network, P, in order to achieve good speech recognition performance. The quantitative measure of performance is the joint probability that the network produces target class $t^{(e)}$ given $x^{(e)}$ for all $e = 1 \ldots E$. If the training examples are assumed to be independent, the joint probability of the set of training examples can be written as $$\tilde{L} = \prod_e z_t(e). \quad (22)$$

The training procedure is a maximum likelihood method that involves searching for a set of network parameters $P^*$ that $\tilde{L}$. Rather than maximizing $\tilde{L}$ directly, it is instead convenient to use a performance measure that is the logarithm of this probability:

$$L = \sum_e \ln z_t(e). \quad (23)$$

Because of the monotonicity of the logarithm, the maxima of $\tilde{L}$ and $L$ are the same. The parameter space P is searched via gradient ascent in L, as described below.

To perform gradient ascent, it is necessary to know the derivatives of L with respect to the various free parameters of the network:

$$\frac{\partial L}{\partial m_i} = \begin{cases} \frac{z_i - 1}{v_i}(m_i - h) & \text{if } i = t \\ \frac{z_i}{v_i}(m_i - h) & \text{otherwise} \end{cases} \quad (24)$$

$$\frac{\partial L}{\partial v_i} = \begin{cases} \frac{z_i - 1}{v_i}\left(\frac{n_h}{2} - \frac{|h - m_i|^2}{2v_i}\right) & \text{if } i = t \\ \frac{z_i}{v_i}\left(\frac{n_h}{2} - \frac{|h - m_i|^2}{2v_i}\right) & \text{otherwise} \end{cases} \quad (25)$$

$$\frac{\partial L}{\partial \mu_{NOTA}} = \begin{cases} \frac{1 - z_{NOTA}}{\mu_{NOTA}} & \text{if NOTA} = t \\ -\frac{z_{NOTA}}{\mu_{NOTA}} & \text{otherwise} \end{cases} \quad (26)$$

$$\frac{\partial L}{\partial h} = \sum_i \frac{z_i}{v_i}(h - m_i) - \frac{1}{v_t}(h - m_t) = -\sum_i \frac{\partial L}{\partial m_i} \quad (27)$$

The derivatives of the other network parameters—$W_1$, $W_2$, $b_1$, and $b_2$—are computed using a well-known standard back propagation algorithm. [Rumelhart86].

In the preferred embodiment, rather than optimizing directly over the parameters $v_i$ and $\mu_{NOTA}$, optimization occurs over parameters $\hat{v}_i$ and $\hat{u}_{NOTA}$ where $$v_i = \exp(\hat{v}_i) \quad (28)$$

$$\mu_{NOTA} = \exp(\hat{u}_{NOTA}) \quad (29)$$

This allows for an unconstrained optimization while still ensuring that the variances and probability density remain positive.

Class Priors

The class priors, {p(class 1)}, are assumed to be known, and are not necessarily reflected in the training corpus distribution. These priors provide information not only about the relative frequency of alternative words, but also about the relative frequency of the words to the NOTA class.

To better condition the learning problem, input to the network is normalized such that the activity of each input unit over the training corpus has zero mean and standard deviation 0.5. Normalization is achieved by transforming the raw input pattern, $\tilde{x}$, into the actual input pattern, x:

$$x_i = \frac{\tilde{x} - \tilde{x}_i}{2\sigma_i}, \quad (30)$$

where $\tilde{x}_i$ is the mean value of input element i over the entire training corpus and $\sigma_i$ is the unbiased estimator of the standard deviation of input element i over the training corpus. The normalization procedure is used for all training examples, as well as all future inputs to the neural network. (The means and standard deviations from the training corpus are used, even for test data.)

The network is trained on inputs that correspond to words in the corpus, as well as other instances that belong in the NOTA class. To ensure good performance of the network on new examples (generalization testing), the training examples should be representative of the patterns that will be encountered during generalization testing. While this should not be a problem for the word examples, it may be more difficult for the NOTA examples. The probability model described above deals with this to some extent by assuming that NOTA examples come from a broad distribution.

There should be roughly equal numbers of examples from each class in the training corpus. The prior probabilities in the probability model can be set during training to reflect the base probabilities in the training corpus. They are then changed following teaming to reflect their true probability of occurrence in the testing environment.

To begin training the network, the free parameters P are initialized to small randomly chosen values. We adopt a scheme for setting the weights ($W_i$) and biases ($b_i$) in the two hidden layers by selecting random numbers from a normal distribution with mean 0.0 and standard deviation 1.0, and the weights+bias feeding into each unit j in each hidden layer i are then normalized such that $$\sum_k |w_{ijk}| + |b_{ij}| = 2. \quad (31)$$

The $M_{jk}$ are initialized from a uniform distribution in the range $[-1,1]$, and the $v_j$ are set to a fixed value that allows the class clusters to span a large proportion of hidden unit space h.

A training epoch is defined to be one complete pass through the data, as required to compute the gradient $\nabla pL$. Following each epoch, each free parameter p in the network is adjusted according to a steepest-descent gradient following procedure:

$$\Delta p = \alpha_p \frac{\partial L}{\partial p} \quad (32)$$

where $\alpha_p$ is a step size or learning rate for parameter p.

In neural network terminology, the network is trained in "batch" mode without momentum, and the training proceeds for roughly 100–500 epochs. The procedure for determining the specific amount of training is described below.

A global learning rate, $\alpha$ is computed to ensure that the performance measure L is increasing most of the time, using a variant of the prior art delta-bar-delta algorithm. [Jacobs88]. When L increases from one epoch to the next, $\alpha$ is incremented by a fixed constant; when L decreases, $\alpha$ is scaled down by a fixed factor.

The learning rate for each parameter q, $\alpha_q$ is set by dividing $\alpha$ by a constant. For the parameters in $W_1$, and $b_1$, the constant is $\sqrt{n_x}$; for the parameters in $W_2$ and $b_2$, the constant is $\sqrt{n_{h_1}}$; for the $m_k$ and $v_k$ parameters, the constant is 0.1.

A central problem with neural network models, and more generally all statistical models with a large number of free parameters, is that the models can overfit the available data, i.e., they model the noise in the data set as well as the regularities. [Moody94]. The preferred embodiment employs three methods simultaneously to minimize the possibility of overfitting.

The first method is known as smoothness cost. The speech signal is segmented into a sequence of time slots, and the information in the signal within a time slot is represented by a static feature vector. Given the temporal continuity of adjacent feature vectors in the sequence, feature vectors of adjacent time slices will tend to be similar. If there is indeed some redundancy of this sort, then the network weights connecting to these feature vectors should be similar. That is, the network should not be allowed arbitrary flexibility in responding to adjacent features.

One way of encouraging the neural network to treat adjacent time slices as similar is to bias weighting coefficient from adjacent input features to be similar. If $x_{i,t}$ denotes the input feature i at time slice t, this is achieved by a so-called regularization term in the performance measure [Szeliski94]:

$$L = \sum_e \ln z(e) - \lambda \sum_i \sum_t (x_{i,t} - x_{i,t+1})^2, \quad (33)$$

where $\lambda$ is the regularization constant which determines the importance of the smoothness constraint relative to the primary performance measure.

Another way to avoid overfitting is to optimize the selection of a particular neural network architecture from the broad class described here. One must specify the number of hidden units, $n_{h_1}$, and $n_{h_2}$, and the hidden unit activation functions $f_1$ and $f_2$. If $n_{h_2}=0$, then we consider $f_2$ as either the identity map or the tanh function; if $n_{h_2}>0$, we assign $f_1$=tanh and $f_2$ as either the identity map or tanh.

The tradeoffs involved in selecting the number of hidden units in a neural network are discussed by Geman, Bienenstock, & Doursat. [Geman92] Basically, if too many hidden units are used—there are too many free parameters—the network will overfit the data, resulting in excellent performance on the training corpus but poor generalization performance, i.e., performance on data not contained in the training corpus. If too few hidden units are used, then both training and generalization performance will be poor.

Standard heuristics are used to select the appropriate number of hidden units, and cross validation ([Eubank88]; [Mosteller68]; [Stone78]) is then applied to select the specific architecture—specific values of $n_{h_1}$, and $n_{h_2}$, as well as the functions $f_1$ and $f_2$.

Cross-validation is a sample re-use method for estimating generalization performance. It makes maximally efficient use of the available data. The network architecture with the highest cross validation score is selected from among the candidates. The cross validation methodology used in evaluating a neural network architecture is as follows. The available training data is partitioned into twenty disjoint sets, $S_i$, i=1 . . . 20, with roughly the same number of exemplars of each class in each set. For each set $S_i$, a network is trained on all data excluding $S_i$, and then the network is used to assess the proportion of correct classifications on $S_i$, denoted $p_i$. The cross validation score is the mean of $p_i$ over all sets.

Each network is initialized with random weights. To eliminate the issue of how much training each network should receive—which is addressed below—the proportion on $S_i$ is computed every training epoch for about five hundred epochs. Then $p_i$ is assigned the maximum value observed during this training interval.

A further method of avoiding overfit is to optimize the number of training epochs. Researchers have noted that the effective number of a parameters in a network is not necessarily the same as the actual number of free parameters. [Moody94]. As a network receives more training, the effective number of parameters appears to increase [Weigend94]. Consequently, one important strategy for controlling the effective number of parameters in a network is to stop training prior to the network finding a local optimum in the performance measure. By controlling the effective number of free parameters, this stop-training methodology can affect generalization performance. [Finnoff92]; [Wang94].

Stopped training is commonly used in conjunction with a validation procedure in which the available data is split into training and validation sets. As the network is trained on the training set, performance is evaluated on the validation set; when performance on the validation set begins to drop, training is stopped. The problem with this approach is that a small validation set may not yield accurate predictions of the network's generalization performance, yet if more data is set aside for the validation set, less is available for training.

In the preferred embodiment, the stopped-training methodology is combined with a variant of cross-validation. The training data is split into a subsets, each with roughly five examples from each word class. For each subset i, a network is trained on all data except that contained in subset i (starting with random initial weights), and performance on i is tracked as a function of the number of training epochs. These performance curves are averaged over the s subsets, and the point on the average curve yielding best performance is chosen as the point at which to stop training.

Figure 6B:
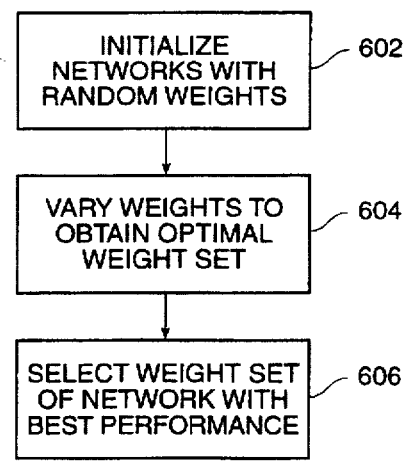
FIG. 6B is a flowchart describing steps of training a neural network classifier in accordance with the invention.

FIG. 6B is a flowchart describing steps of training a neural network classifier in accordance with the invention. At step 602, each of a large number of networks (20–50) is initialized with random weights. At step 604, each network is trained on the entire training corpus for the number of epochs specified by cross validation to obtain an optimal weight set. Weights are varied during each training epoch. At step 606, the network with the best performance is then chosen, and its weight set P* is recorded.

In the preferred embodiment, the neural net depicted in FIG. 6 is simulated in microprocessor 9. The simulation involves realizing the neural network activation update equations in software. The network parameters P* selected by the training procedure above are stored in ROM 11. After a word is spoken into microphone 1 and is prepared for the neural network by microprocessor 9, the neural network software then computes the activation levels of the output units as a function of the speech signal representation and the stored neural network parameters. The result is a probability distribution over word classes which can then be used by microprocessor 9 to determine a response.

The preferred embodiment of the invention has been shown to recognize speakers saying the digits zero through nine with an accuracy between 94% and 97%, depending on the quality of the recording. The preferred embodiment of the invention includes the specialized neural network architecture and training procedure to prevent overfitting. With the standard prior art feedforward architecture and training procedure (such as that described by Rumelhart, Hinton, & Williams, [Rumelhart86]), the error rate of the neural net is nearly twice as large.

Speaker-Specific Training

Many applications may call for speaker-dependent recognition. One situation would be when the accuracy must be very high and the reject rate low; speaker-dependent recognition systems are inevitably more robust and accurate. Another situation is when users would like to use their own terminology or secret code word to control a device.

The invention as described thus far is geared toward speaker-independent recognition. To perform speaker-dependent recognition, the neural network would have to be trained on samples provided by the speaker. However, implementing the neural network training procedure in microprocessor 9 is not feasible due to memory and computational limitations. (Standard neural network training would require that all training examples be held in memory and be repeatedly analyzed; this could involve 2 kilobytes of RAM and 10 megaflops of computing cycles.)

Nonetheless, there is a heuristic training procedure that could be used to tune the neural network to respond to a particular speaker. This procedure is based on the fact that the neural network can be divided into two stages: the transformation from the input features (x) to the hidden representation (h) and the application of the Bayes classifier over the hidden representation. If the first stage is fixed and only the Gaussian class centers (the $m_i$) are allowed to be adjusted, the computational and memory costs are minimal.

The procedure is as follows. A speaker-specific training example is presented to the net, and the input representation is transformed to the hidden representation. The Gaussian center of the target word class is then moved a fraction γ of the way to the point in the hidden space that corresponds to the training example, i.e., $$\Delta m_i = \gamma(h - m_i) \tag{34}$$

This procedure does not yield improvements as good as those obtained by a true gradient ascent procedure, but it does significantly improve performance and can be used to train novel words as well.

Incorporating Expectations into Neural Network Decision Making

If the user is prompted with a question such as "What is 3+4?", one can reasonably suppose the user is more likely to respond "seven" than any other digit. Recognition performance of the neural network can be improved by incorporating this expectation into the decision making process. This is easily achieved because the neural network has an explicit representation of the class priors, {p(class i)}. The earlier description assumed that these priors were fixed, but they can be set dynamically based on expectations. The consequence is that the neural network will more readily "hear" the word seven.

Improving Performance by Rejecting Low Confidence Responses

In the preferred embodiment, performance is improved by rejecting low confidence responses. The output of the neural network is subject to interpretation. One possibility is simply to consider the spoken utterance to lie in the word class that has highest probability. For example, suppose the neural network produces a response probability of 0.60 for "one" and 0.40 for "nine". The chosen response would then be "one". Another possibility is to treat the class probability ($Z_k$) as a confidence level, and if the confidence level falls below some threshold, say 0.75, to reject the response. Thus, with a probability of 0.60, the class "one" would be rejected and the speaker is asked to repeat the word. With this approach, the error rate is decreased by about a factor of two and repetition of the word is required about 5% of the time. This procedure is worthwhile in applications where incorrectly classifying an utterance can be costly relative to the imposition of asking the speaker to repeat the utterance.

Improving Performance with Committees of Classifiers

Figure 7:
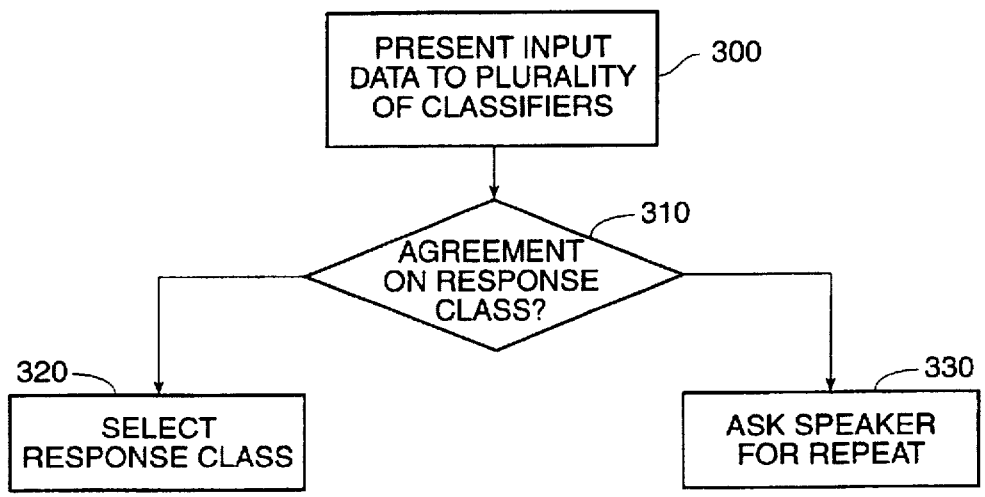
FIG. 7 is a flowchart describing the steps of improving, in accordance with the invention, the reliability of the recognizer using committees of two or more neural networks or other types of pattern classification systems.

FIG. 7 is a flowchart describing the steps of improving, in accordance with the invention, the reliability of the recognizer using committees of two or more neural networks or other types of pattern classification systems. At step 300, the input data is presented to all of the classifiers. If, at step 310, they agree on the response class (or if there is a clear majority), then that response class is selected at step 320; otherwise, the speaker is asked to repeat the word at step 330.

Consider the case of two pattern classifiers. If they are identical, this committee method provides no benefit because they will never disagree. At the other extreme, if the two classifiers are uncorrelated and they each have a 95% probability of producing the correct answer, then they will produce the same right answer with probability $0.95^2=0.9025$, they will produce the same wrong answer with probability $0.05^2 \times 0.1 = 0.00025$, and they will disagree with probability 0.09725. Thus, by rejecting 9.725% of responses, the error rate can be reduced from 5% to 0.025%.

It has been found by experiment that pairs of neural networks with individual recognition probabilities of roughly 95% are neither fully correlated nor uncorrelated, as the two examples above assume. With a typical correlation of 0.50, examples that have been studied produce recognition accuracies above 98%, at the of asking the speaker to repeat the word about 7% of the time. The neural network's estimates of the reliability of their responses may be considered by rejecting any analysis in which either of the two nets produce a confidence estimate below 0.75. In this case, experiments have shown greater than 99% accuracy at the expense of asking the speaker to repeat a word about 10% of the time.

The inventors have discovered several techniques for producing neural networks with uncorrelated errors. These include training the different networks on different subsets of the available data, using different neural architectures, varying the amount of training the networks received, and initializing the networks at the start of training to have different random weights.

This committee technique is related to methods proposed in the neural network literature. [Perrone93]; [Wolpert90]; [Xu92]. Generally, these methods involve computing weighted averages of outputs of multiple networks, or taking a majority vote of committee members to reach a decision. The prior art however has not exploited the idea of using disagreement among semi-independent networks to reject inputs.

Thus more than two classifiers may be run on an unknown utterance to achieve whatever level of accuracy is desired, at the expense of asking the user to repeat the utterance more or less frequently. In some applications, it is desirable to give the user control over these parameters such that, for non-critical applications or for small and easily distinguishable word sets, the number of classifiers involved in decision making or the required confidence threshold can be decreased, while for others they can be increased.

Other Features

Although the input amplifier 3 has a wide dynamic range, many recognition errors are caused by the user either speaking too softly or too loudly. Thus, it is desirable to offer the user feedback on how loud to speak. The method incorporated in the preferred embodiment of the present invention to achieve this result is to add speech synthesis software and compressed speech data to ROM 11. This software is activated in microprocessor 9 when the power measured in the acoustic pattern is either too large or too small, and the synthesizer requests that the user talk either louder or softer, as the case may be. The synthesis software decompresses the speech data that is stored in ROM 11 and feeds its output to digital-to-analog converter 13, which generates an output analog waveform that is fed to an external speaker.

Other properties of the speech recognizer electronics can be used in conjunction with the speech synthesizer to produce desired results. For example, an input waveform can be passed through a multi-pole low pass filter which is part of digital difference filter 7, and microprocessor 9 can determine the user's pitch by measuring the dominant frequency in the output of this filter. This information can then be used by the synthesizer, whose output pitch can be adjusted according to the pitch contour of the user. For example, the synthesizer can speak at the same average pitch as the user; or it can have the same pitch as a function of time as does the user; or it can know if the user asked a question or made a statement (since questions usually end with rising pitch and statements end with a falling pitch), and it can respond accordingly.

Figure 8:
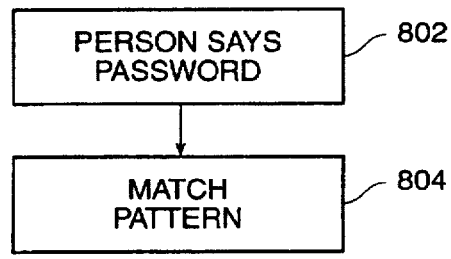
FIG. 8 is a flowchart describing the steps of speaker verification in accordance with one embodiment of the present invention.

The speech recognizer of the preferred embodiment contains capabilities that can enhance its utility in other ways. For example, it can be used for speaker verification or to perform the "password function" in a toy or consumer electronics product. FIG. 8 is a flowchart describing the steps of speaker verification in accordance with one embodiment of the present invention. At step 802 the original speaker says a secret word, whose pattern is stored in RAM in the VLSI chip. To use the product, a person must say the password in a way that provides a pattern that is an acceptable match to that stored in RAM. At step 804, the match may be made by pattern matching or using a neural network. Since the stored pattern can also include the original speaker's pitch contour if one of the filtered waveforms produced by digital difference filter 7 includes the frequency range corresponding to human pitch frequencies, to say the correct password the user must say the same word as the original speaker with the same pitch contour and the same syllable emphasis. Tests have shown that, if the password is known to a user who did not record the original word, the probability is less than about 10% that this user can say the word in a way that satisfies the algorithm, while the original speaker can pass the test more than 90% of the time. Such a capability may also be used in devices that respond only to the owner's command, for example, to unlock the door of a car.

In addition, microprocessor 9 may be used to control the operation of the product containing the speech recognizer, since control code, residing in ROM 11 can be executed to generate appropriate outputs at general purpose input/output ports 15 and this information can control the operation of the product.

While the above is a complete description of the preferred embodiments of the invention, other arrangements and equivalents are possible and may be employed without departing from the true spirit and scope of the invention. The terms and expressions which have been employed here are used as terms of description and not of limitations, and there is no intention, in the use of such terms and expressions, of excluding equivalents of the features shown and described, or portions thereof, it being recognized that various modifications are possible within the scope of the appended claims.

What is claimed is:

1. A method for recognizing an utterance spoken by a user comprising the steps of:

capturing the utterance as an input audio signal;

converting the input audio signal to a digitized representation;

using a single pole digital difference filter repeatedly to obtain a plurality of filtered waveforms from the digitized representation, wherein said single pole digital difference filter is in the form:

$$Y(n)=AY(n-1)+BX(n)+CX(n-1);$$

extracting estimates of a plurality of acoustic parameters from the plurality of filtered waveforms at successive sampling points;

determining an end time of the spoken utterance and a duration of the spoken utterance; thereafter time-normalizing said estimates so that the spoken utterance extends over a predetermined number of time intervals; and analyzing the time-normalized estimates to identify the utterance.

2. The method of claim 1 wherein said step of using a single pole digital difference filter comprises the substeps of:

configuring the single pole digital difference filter using a predetermined set of filter parameters;

applying the digitized representation to an input of the single pole digital difference filter; thereafter modifying the set of filter parameters of the single pole digital difference filter to reconfigure the digital difference filter;

directing a previous output signal of the single pole digital difference filter to the input of the single pole digital difference filter to obtain a new output signal of the single pole digital filter; and repeating said modifying step and said directing step to simulate a bandpass filter having one of said plurality of waveforms as an output as a cascade of successive filter stages.

3. The method of claim 1 wherein said extracting step occurs concurrently with said capturing step.

4. The method of claim 1 wherein said analyzing step is performed using a pretrained neural network.

5. The method of claim 4 wherein said neural network is a feedforward, multilayer, nonlinear classifier.

6. The method of claim 1 wherein said analyzing step comprises the substep of:

assigning the utterance to one of a plurality of categories, said plurality of categories including a plurality of selected word classes and a class that includes all utterances not included in the plurality of selected word classes.

7. The method of claim 4 wherein said neural network operates as a Bayes classifier.

8. The method of claim 4 further comprising the step of:

training the neural network with training data using a numerical optimization procedure.

9. The method of claim 8 wherein said training step comprises the substeps of:

initializing weights of the neural network to be a set of initial values; and thereafter varying the neural network weights in response to training data input to the neural network until an optimal weight set is obtained.

10. The method of claim 9 wherein said step of training further comprises the substeps of:

repeating said steps of initializing and varying using different sets of initial values in said initializing step to obtain a plurality of optimal weight sets; and thereafter selecting from the plurality of optimal weight sets, an optimal weight set that adjusts the neural network to have a minimum error given the training data as input.

11. The method of claim 1 wherein one of said acoustic parameters is a zero crossing rate of one of said plurality of filtered waveforms.

12. The method of claim 1 wherein one of said acoustic parameters is a power measure of one of said plurality of filtered waveforms.

13. The method of claim 1 wherein one of said acoustic parameters is said duration of the spoken utterance.

14. The method of claim 1 wherein said step of analyzing comprises the substep of:

comparing the utterance to a stored pattern for speaker verification.

15. Apparatus for recognizing an utterance spoken by a user, said apparatus comprising:

an analog-to-digital converter that converts an audio signal into a digitized representation;

a repeatedly accessed single pole digital difference filter that obtains a plurality of filtered waveforms from the digitized representation, wherein said single pole digital difference filter is in the form:

$$Y(n)=AY(n-1)+BX(n)+CX(n-1);$$

a feature extractor that extracts estimates of a plurality of acoustic parameters from the plurality of filtered waveforms at successive sampling points;

a timer that determines an end time of the spoken utterance and a duration of the spoken utterance;

a time-normalizer that time-normalizes said estimates so that the spoken utterance extends over a predetermined number of time intervals; and a classifier that analyzes the time-normalized estimates to identify the spoken utterance.

16. The apparatus of claim 15 further comprising a digital difference filter controller that:

configures the digital difference filter using a predetermined set of filter parameters;

applies the digitized representation to an input of the digital difference filter;

modifies the filter parameters of the digital difference filter to reconfigure the digital difference filter;

directs a previous output signal of the digital difference filter to the input of the digital difference filter to obtain a new output signal of the digital filter; and repeats said modifying step and said directing step to simulate a bandpass filter having one of said plurality of waveforms as an output.

17. The apparatus of claim 15 wherein said classifier is a pretrained neural network.

18. The method of claim 1 wherein A, B, and C are selected so that no multiplication by one of A, B, or C required for calculating a single term of Y(n) requires more than two shifts and two adds.

19. A method for recognizing an utterance spoken by a user comprising the steps of:

capturing the utterance as an input audio signal;

converting the input audio signal to a digitized representation;

using a digital difference filter to obtain a plurality of filtered waveforms from the digitized representation, wherein said single pole digital difference filter is in the form:

$$Y(n)=AY(n-1)+BX(n)+CX(n-1);$$

extracting, concurrently with said capturing step, estimates of a plurality of acoustic parameters from the plurality of filtered waveforms at successive sampling points, concurrently with said capturing step;

determining an end time of the spoken utterance and a duration of the spoken utterance; thereafter time-normalizing said estimates so that the spoken utterance extends over a predetermined number of time intervals; and analyzing the time-normalized estimates to identify the utterance.

20. Apparatus for recognizing an utterance spoken by a user, said apparatus comprising;

an audio input device that accepts speech input from the user including the utterance and provides an electrical signal responsive to the speech input;

an analog-to-digital converter that converts the electrical signal into a digitized representation;

a single pole digital difference filter that obtains a plurality of filtered waveforms from the digitized representation, wherein said single pole digital difference filter is in the form:

$$Y(n)=AY(n-1)+BX(n)+CX(n-1);$$

a feature extractor that extracts, estimates of a plurality of acoustic parameters from the plurality of filtered waveforms at successive sampling points;

a timer that determines an end time of the spoken utterance and a duration of the spoken utterance;

a time-normalizer that time-normalizes said estimates so that the spoken utterance extends over a predetermined number of time intervals; and a classifier that analyzes the time-normalized estimates to identify the spoken utterance.

21. The apparatus of claim 15 wherein A, B, and C are selected so that no multiplication by one of A, B, or C required for calculating a single term of Y(n) requires more than two shifts and two adds.

* * * * *